United States Patent
Day et al.

(10) Patent No.: US 8,578,339 B2
(45) Date of Patent: Nov. 5, 2013

(54) AUTOMATICALLY ADDING BYTECODE TO A SOFTWARE APPLICATION TO DETERMINE DATABASE ACCESS INFORMATION

(75) Inventors: Brian Day, Villa Park, IL (US); Daryl Hoyt, Aurora, IL (US)

(73) Assignee: Symantec Corporation, Mountain View, CA (US)

( * ) Notice: Subject to any disclaimer, the term of this patent is extended or adjusted under 35 U.S.C. 154(b) by 1285 days.

(21) Appl. No.: 11/861,852

(22) Filed: Sep. 26, 2007

(65) Prior Publication Data
US 2009/0083271 A1    Mar. 26, 2009

(51) Int. Cl.
*G06F 9/44* (2006.01)
*G06F 9/45* (2006.01)

(52) U.S. Cl.
USPC ............ 717/128; 717/127; 717/130; 717/158

(58) Field of Classification Search
None
See application file for complete search history.

(56) References Cited

U.S. PATENT DOCUMENTS

| | | | |
|---|---|---|---|
| 6,886,157 B2 | 4/2005 | Long | |
| 7,039,702 B1 | 5/2006 | Churchyard | |
| 7,058,928 B2 * | 6/2006 | Wygodny et al. | 717/128 |
| 7,194,735 B2 | 3/2007 | Barclay | |
| 7,240,335 B2 | 7/2007 | Angel | |
| 7,263,690 B1 | 8/2007 | Shapiro | |
| 7,275,241 B2 | 9/2007 | Choi | |
| 7,281,242 B2 | 10/2007 | Inamdar | |
| 7,293,260 B1 | 11/2007 | Dmitriev | |
| 7,353,504 B2 | 4/2008 | Lagergren | |
| 7,367,025 B1 | 4/2008 | Nikolov | |
| 7,401,324 B1 | 7/2008 | Dmitriev | |
| 7,421,682 B2 | 9/2008 | Viehland | |
| 7,426,717 B1 | 9/2008 | Schang | |
| 7,461,070 B2 | 12/2008 | Srivastava | |
| 7,464,161 B2 | 12/2008 | Chagoly | |
| 7,475,055 B2 | 1/2009 | Hutchison | |
| 7,475,214 B2 | 1/2009 | Hwang | |
| 7,475,388 B2 | 1/2009 | Fong | |
| 7,533,389 B2 | 5/2009 | Verbeke | |
| 8,141,052 B2 * | 3/2012 | Guarraci | 717/127 |
| 8,176,480 B1 * | 5/2012 | Spertus | 717/158 |
| 8,214,806 B2 * | 7/2012 | Cong et al. | 717/127 |
| 8,214,807 B2 * | 7/2012 | Bestgen et al. | 717/128 |
| 8,307,343 B2 * | 11/2012 | Chaudhuri et al. | 717/128 |
| 8,312,435 B2 * | 11/2012 | Wygodny et al. | 717/130 |

(Continued)

OTHER PUBLICATIONS

"Interface java.sql.Connection", Sourceforge.net, retrieved May 2011, pp. 1-4, <http://javadiff.sourceforge.net/jdiff/reports/j2se131_j2se14_docs/changes/java.sql.Connection.html>.*

(Continued)

*Primary Examiner* — Thuy Dao
(74) *Attorney, Agent, or Firm* — Wilmer Cutler Pickering Hale and Dorr LLP (57) ABSTRACT

A system and method for automatically analyzing virtual machine bytecode of a software application and adding additional bytecode operable to determine information regarding database access performed by the software application are described. According to one embodiment of the method, program code of a software application may be received, wherein the program code includes bytecode for a virtual machine. The bytecode may be automatically analyzed to detect access to a database. The method may operate to automatically add additional bytecode to the bytecode of the software application, where the added bytecode is operable to determine information regarding the access to the database.

16 Claims, 3 Drawing Sheets

(56) References Cited

U.S. PATENT DOCUMENTS

| | | | | |
|---|---|---|---|---|
| 2003/0050932 | A1* | 3/2003 | Pace et al. | 707/100 |
| 2003/0135758 | A1 | 7/2003 | Turner | |
| 2004/0133882 | A1 | 7/2004 | Angel | |
| 2005/0039187 | A1 | 2/2005 | Avakian | |
| 2005/0091638 | A1* | 4/2005 | Bley | 717/111 |
| 2005/0223365 | A1* | 10/2005 | Smith et al. | 717/128 |
| 2005/0240904 | A1* | 10/2005 | Isakov et al. | 717/128 |
| 2006/0136516 | A1* | 6/2006 | Jain et al. | 707/204 |
| 2006/0288025 | A1* | 12/2006 | Kumar et al. | 707/101 |
| 2007/0011330 | A1* | 1/2007 | Dinker et al. | 709/226 |
| 2007/0168670 | A1 | 7/2007 | Dean | |
| 2008/0301710 | A1 | 12/2008 | Shetty | |

OTHER PUBLICATIONS

"Java version history", Wikipedia, retrieved May 2011, pp. 1-9, <http://en.wikipedia.org/wiki/Java_version_history>.*

Bujdei et al., Optimize databases for health monitoring systems, Jul. 2008, 8 pages.*

Kapfhammer et al., Database-aware test coverage monitoring, Feb. 2008, 10 pages.*

"Introduction to Adaptive Instrumentation with Symantec Indepth™ for J2EE Application Performance Management," Symantec Corp., May 2006, http://eval.symantec.com/mktginfo/enterprise/white_papers/10574475_Indepth_wp_v3.pdf.

"Nastel jKool™ Installation and User's Guide," Nastel Technologies, Inc., Jul. 2006, http://1885441442426375655-a-jkoolonline-com-s-sites.googlegroups.com/a/jkoolonline.com/jkool-online/download/jkool_user_guide.pdf.

"JDBC Connection Pool Counters", IBM Corp. This is a web page related to the IBM Websphere Application Server product. The web page is dated as being last updated on Nov. 24, 2008. However it is believed that the web page was online before the application was filed. The URL of the web page is: http://publib.boulder.ibm.com/infocenter/wasinfo/v6r0/topic/com.ibm.websphere.express.doc/info/exp/ae/rprf_datacounter2.html.

"WLDF Instrumentation Library," BEA Systems, Inc. This is a web page related to the BEA WebLogic Server product. The web page has a copyright date of 2009. However it is believed that the web page was online before the application was filed. The URL of the web page is: http://edocs.bea.com/wls/docs91/wldf_configuring/appendix_instrum_library.html.

"Mobile Code Security by Java Bytecode Instrumentation," Chander et al., Aug. 2002, http://www.cis.upenn_edu/~ishin/papers/discex.pdf.

"HUP: A Heap Usage Profiling Tool for Java Programs," Pan et al., Sep. 2001, http://hup.sourceforge.net/manual.pdf.

U.S. Appl. No. 11/863,828, entitled "Automatically Modifying a Native Code Module Accessed from Virtual Machine Bytecode to Determine Execution Information", filed Sep. 27, 2007.

U.S. Appl. No. 11/862,359, entitled "Automatically Adding Bytecode to a Software Application to Determine Network Communication Information", filed Sep. 27, 2007.

Symantec Corporation, "Veritas™ Volume Replicator Administrator's Guide", Solaris, 5.0 Maintenance Pack 3, 2008.

Symantec Corporation, "Veritas™ Volume Manager Administrator's Guide", Solaris, 5.0 Maintenance Pack 3, 2008.

* cited by examiner

AUTOMATICALLY ADDING BYTECODE TO A SOFTWARE APPLICATION TO DETERMINE DATABASE ACCESS INFORMATION

BACKGROUND OF THE INVENTION

1. Field of the Invention

This invention relates generally to computer software. More particularly, the invention relates to a system and method for automatically analyzing virtual machine bytecode of a software application and adding additional bytecode operable to determine information regarding database access performed by the software application.

2. Description of the Related Art

Software developers typically create the source code for software applications in a high-level programming language by writing textual program statements that specify the application's functionality. The source code may then be compiled into executable machine code that can be executed by a physical processor. This executable machine code is also referred to as native code because it is formatted so that it executes on a specific type of processor using that processor's instruction set. Thus, native code is typically not portable across different types of computing devices, e.g., devices that use different types of processors.

An alternative method of program execution is to compile the source code into an intermediate form of code called bytecode, which is a binary representation of program instructions suitable for execution on a specific type of virtual machine. The virtual machine itself is implemented in software and is executed by the processor of the physical computing device. A software application that has been compiled into bytecode instructions may be executed on the virtual machine, e.g., by the virtual machine dynamically interpreting the bytecode instructions. Alternatively, another level of compilation may be performed. For example, some virtual machine runtime environments perform just-in-time compilation to compile bytecode into native code during execution of the software application.

The virtual machine provides a layer of abstraction between the compiled bytecode and the underlying hardware platform and operating system. Thus, compiling a software application into bytecode rather than native code may reduce the software application's dependence on specific hardware. For example, the same bytecode may be executed on several different types of computing platforms as long as a virtual machine to execute the bytecode is available on all the respective computing platforms.

Software application code that has been compiled into bytecode may be operable to perform any of various kinds of functions. Many software applications utilize a database to store or manage data for various purposes. In particular, many software applications connect to relational databases in order to manage data.

SUMMARY

Various embodiments of a system and method for automatically adding bytecode to a software application are described. According to one embodiment of the method, program code of a software application may be received, wherein the program code includes bytecode for a virtual machine. The bytecode may be automatically analyzed to detect access to a database. The method may operate to automatically add additional bytecode to the bytecode of the software application, where the added bytecode is operable to determine information regarding the access to the database.

In some embodiments, analyzing the bytecode to detect the access to the database may comprise analyzing the bytecode to detect one or more programmatic calls (e.g., function calls or method calls) that accesses the database. The added bytecode may be operable to determine database access information from the one or more programmatic calls. For example, in some embodiments the added bytecode may be operable to determine a parameter value passed in a programmatic call, wherein the parameter value specifies information regarding access to the database.

In various embodiments the added bytecode may be operable to determine any of various kinds of information regarding the database access performed by the software application. As one example, the software application may create or open one or more connections to the database, and the automatically added bytecode may be operable to determine information regarding the one or more connections. For example, the added bytecode may determine information such as a time when a database connection is opened or closed, an amount of time the database connection stays open, or the number of database connections opened by the software application.

As another example, the added bytecode may be operable to determine information identifying the database, such as a URL, resource name, file name, or other identifier information that identifies the database.

As another example, the added bytecode may be operable to determine information used for connecting to the database, such as authentication information, e.g., a username and password.

As another example, the added bytecode may be operable to determine statistical information indicating database access statistics, such as a number of times that database access calls are executed or an amount of time spent accessing the database.

As another example, the added bytecode may be operable to determine which portions of data in the database the software application accesses. For example, in a relational database, the added bytecode may determine one or more database tables accessed by the software application.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for automatically adding additional bytecode to previously existing bytecode of a software application are described herein, where the additional bytecode is operable to determine information regarding database access performed by the software application.

Figure 1:
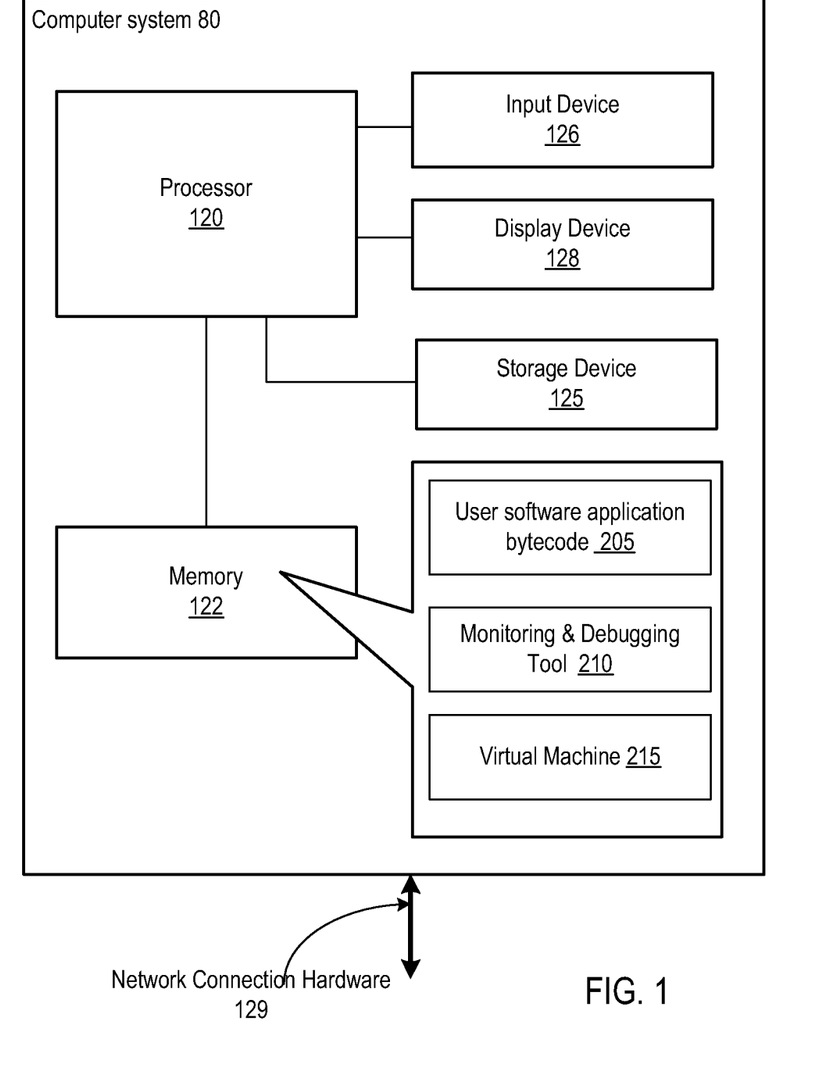
FIG. 1 illustrates one embodiment of a computer system configured to automatically add additional bytecode to a software application, where the additional bytecode is operable to determine information regarding database access performed by the software application.

FIG. 1 illustrates one embodiment of a computer system 80 that is configured to automatically add the additional bytecode to the software application. In various embodiments the computer system 80 may comprise any type of computer system. The computer system 80 may include one or more processors 120 coupled to memory 122. In some embodiments, the memory 122 may include one or more forms of random access memory (RAM) such as dynamic RAM (DRAM) or synchronous DRAM (SDRAM). However, in other embodiments the memory 122 may include any other type of memory instead or in addition.

The memory 122 may be configured to store program instructions and/or data. In particular, the memory 122 may store bytecode 205 for a user software application, e.g., a software application created by a user (e.g., an application developer). In various embodiments the bytecode 205 may comprise any type of bytecode, e.g., may comprise bytecode configured to execute on any of various types of virtual machines. For example, in some embodiments the bytecode 205 may comprise Java bytecode, e.g., bytecode for a Java Virtual Machine (a virtual machine constructed in accordance with a published Java Virtual Machine specification). As another example, in some embodiments the bytecode 205 may comprise bytecode for a Common Language Runtime (CLR) virtual machine, such as bytecode for a Microsoft NET software application.

The memory 122 may also store a monitoring and debugging tool 210. The processor 120 may execute the monitoring and debugging tool 210, where the monitoring and debugging tool 210 executes to automatically add the additional bytecode to the bytecode 205 of the user software application. For example, the monitoring and debugging tool 210 may automatically analyze the bytecode 205 to detect access to a database. In response to detecting the access to the database, the monitoring and debugging tool 210 may add the additional bytecode to the bytecode 205, where the additional bytecode is operable to determine information regarding the access to the database. For example, in an embodiment in which the bytecode 205 comprises Java bytecode, the monitoring and debugging tool 210 may utilize Java bytecode instrumentation techniques to automatically add bytecode to determine the information regarding the access to the database.

As illustrated in FIG. 1, in some embodiments the memory 122 may also store a virtual machine 215, e.g., a virtual machine operable to execute the user software application. The virtual machine 215 may execute or interpret the bytecode 205 as well as the additional bytecode added by the monitoring and debugging tool 210. Thus, the additional bytecode may execute to determine information regarding the database access performed by the bytecode 205 during execution of the user software application.

In other embodiments, the user software application may be executed directly by the processor 120 instead of executing on a virtual machine 215. For example, in some embodiments the bytecode of the user software application may be compiled into native code for execution by the processor 120. In some embodiments a just-in-time compilation technique may be used to dynamically compile portions of the bytecode of the user software application into native code as needed during execution of the user software application.

Referring again to FIG. 1, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the computer system 80 may include multiple processors 120.

The computer system 80 also includes or is coupled to one or more storage devices 125. In various embodiments the storage devices 125 may include any of various kinds of storage devices operable to store data, such as optical storage devices, disk drives, tape drives, flash memory devices, etc. As one example, the storage devices 125 may be implemented as one or more disk drives configured independently or as a disk storage system. In some embodiments the storage devices 125 may store representations of the user software application bytecode 205, the monitoring and debugging tool 210, and/or the virtual machine 215 before these components are loaded into the memory 122, and/or the storage devices 125 may store portions of these components paged out from the memory 122 using paging techniques.

The computer system 80 may also include one or more input devices 126 for receiving user input from a user of the computer system 80. The input device(s) 126 may include any of various types of input devices, such as keyboards, keypads, microphones, or pointing devices (e.g., a mouse or trackball). The computer system 80 may also include one or more output devices 128 for displaying output to the user. The output device(s) 128 may include any of various types of output devices or display devices, such as LCD screens or monitors, CRT monitors, etc.

In some embodiments the computer system 80 may also include network connection hardware 129 through which the computer system 80 connects to a network. The network connection hardware 129 may include any type of hardware for coupling the computer system 80 to the network, e.g., depending on the type of network. In various embodiments, the computer system 80 may be coupled to any type of network or combination of networks.

Figure 2:
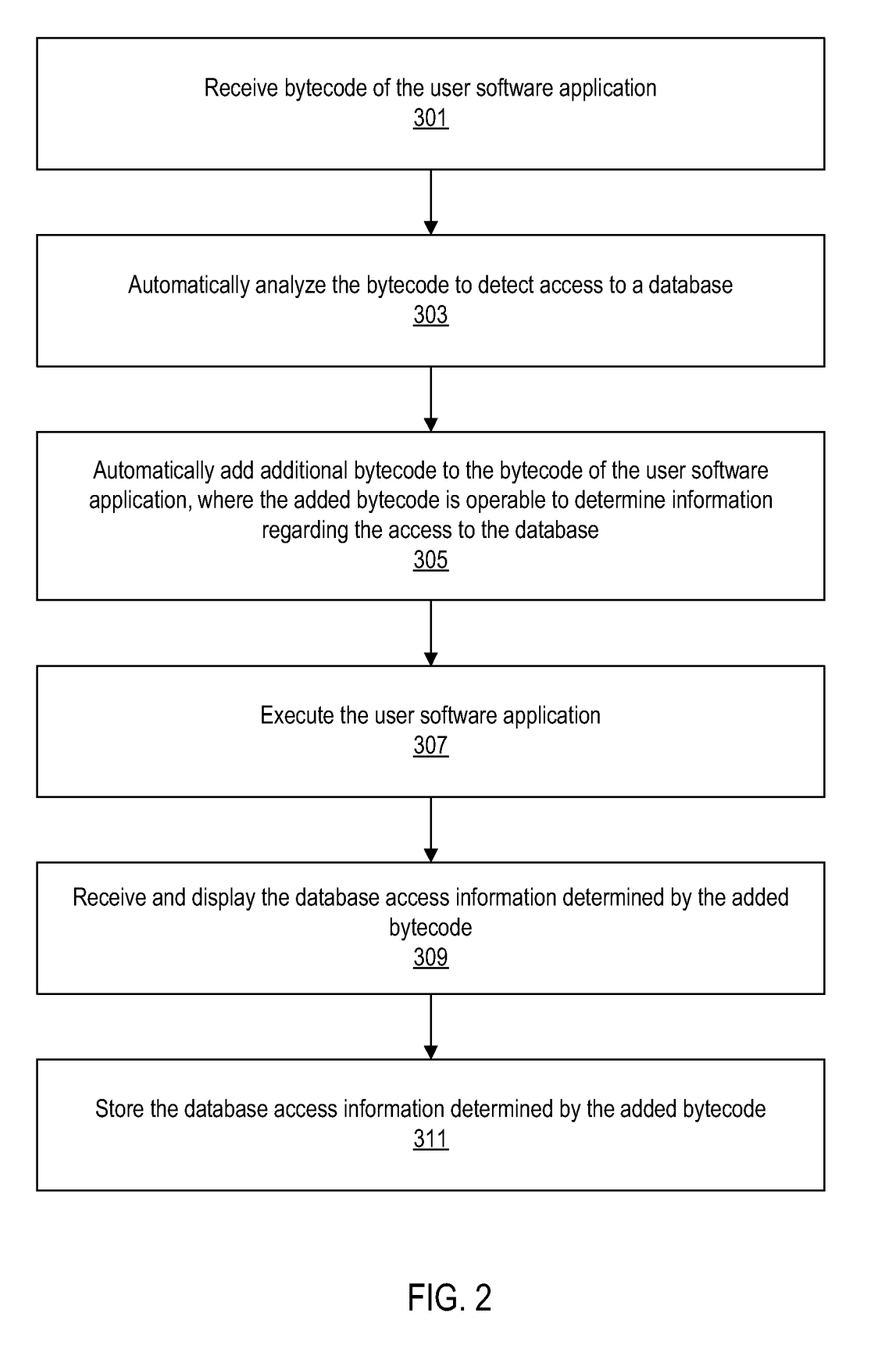
FIG. 2 is a flowchart diagram illustrating one embodiment of a method for adding the additional bytecode to previously existing bytecode of the software application.

FIG. 2 is a flowchart diagram illustrating one embodiment of a method for adding additional bytecode to previously existing bytecode 205 of a user software application. It is noted that the blocks illustrated in FIG. 2 may be performed in various orders, and various blocks may be performed concurrently or repeatedly.

In 301, the bytecode 205 of the user software application may be received by the monitoring and debugging tool 210.

In 303, the monitoring and debugging tool 210 may automatically analyze the bytecode 205 to detect access to a database.

In 305, the monitoring and debugging tool 210 may automatically add additional bytecode to the previously existing bytecode 205 of the user software application, where the added bytecode is operable to determine or obtain information regarding the access to the database.

In 307, the user software application may be executed. Executing the user software application may include executing the bytecode 205 (or equivalent native code) that performs the database access, as well is executing the additional bytecode (or equivalent native code) which determines the information regarding the database access. In some embodiments the user software application may be executed by the virtual machine 215.

In various embodiments, the functionality illustrated in FIG. 2 may be performed in any of various ways. For example, in some embodiments the additional bytecode may be statically added to the previously existing bytecode 205 before the user software application is launched for execution.

In other embodiments, the additional bytecode may be dynamically added to the previously existing bytecode 205 during execution of the user software application. For example, in some embodiments, the user software application may utilize object-oriented classes, where the classes may be dynamically loaded during execution of the user software application. When a class is loaded, the class may be automatically analyzed to detect whether the class or a method in the class performs database access. If so, then the bytecode that implements the class may be automatically modified, e.g., by adding additional bytecode that determines or obtains information regarding the database access.

In various embodiments the user software application may access any kind of database. Thus, in various embodiments the bytecode that is automatically added to the user software application may be operable to determine information regarding any kind of database. Examples of databases for which access information may be determined include relational databases and object oriented databases.

The user software application may access the database in various ways, and the monitoring and debugging tool 210 may be operable to automatically add bytecode to the user software application in order to determine any of various kinds of information regarding the database access performed by the user software application. As one example, the user software application may create or open one or more connections to the database, and the automatically added bytecode may be operable to determine information regarding the one or more connections. For example, the added bytecode may determine information such as a time when a database connection is opened or closed, an amount of time the database connection stays open, or the number of database connections opened by the user software application.

As another example, the added bytecode may be operable to determine information identifying the database, such as a URL, resource name, file name, or other identifier information that identifies the database.

As another example, the added bytecode may be operable to determine information used for connecting to the database, such as authentication information, e.g., a username and password.

As another example, the added bytecode may be operable to determine statistical information indicating database access statistics, such as a number of times that database access calls are executed or an amount of time spent accessing the database.

As another example, the added bytecode may be operable to determine which portions of data in the database the user software application accesses. For example, in a relational database, the added bytecode may determine one or more database tables accessed by the user software application.

In various embodiments the monitoring and debugging tool 210 may be operable to use any of various techniques in order to detect database access performed by the user software application. In some embodiments detecting the database access may comprise detecting one or more programmatic calls (e.g., function calls or method calls) that access the database. For example, in some embodiments the user software application may be implemented in a programming language or environment which provides one or more standard libraries or programming interfaces for accessing a database. Thus, database access may be detected by detecting calls to these standard libraries or programming interfaces.

For example, if the monitoring and debugging tool 210 detects that the user software application includes a method which performs a programmatic call that accesses the database then the monitoring and debugging tool 210 may automatically add additional bytecode to the previously existing bytecode of the method or may automatically modify the previously existing bytecode of the method in order to determine information regarding the programmatic call. In various embodiments, the additional or modified bytecode may determine various types of information regarding the programmatic call, e.g., depending on the particular function performed by the programmatic call. In some embodiments, bytecode for determining one or more parameter values passed to the programmatic call may be automatically added to the method. The one or more parameter values may specify information regarding access to the database.

Referring again to FIG. 2, the method may further comprise receiving and displaying the database access information determined by the bytecode that was added to the user software application, as indicated in 309. For example, in some embodiments the monitoring and debugging tool 210 may receive the database access information, e.g., from the virtual machine 215, and may display a graphical user interface on the display device, where the graphical user interface displays the database access information. The database access information may be displayed during execution of the user software application and/or after the execution has finished.

The method may also or may alternatively comprise storing the database access information, as indicated in 311. For example, after the database access information has been determined it may be written to a log file or stored in a database for future access.

Figure 3:
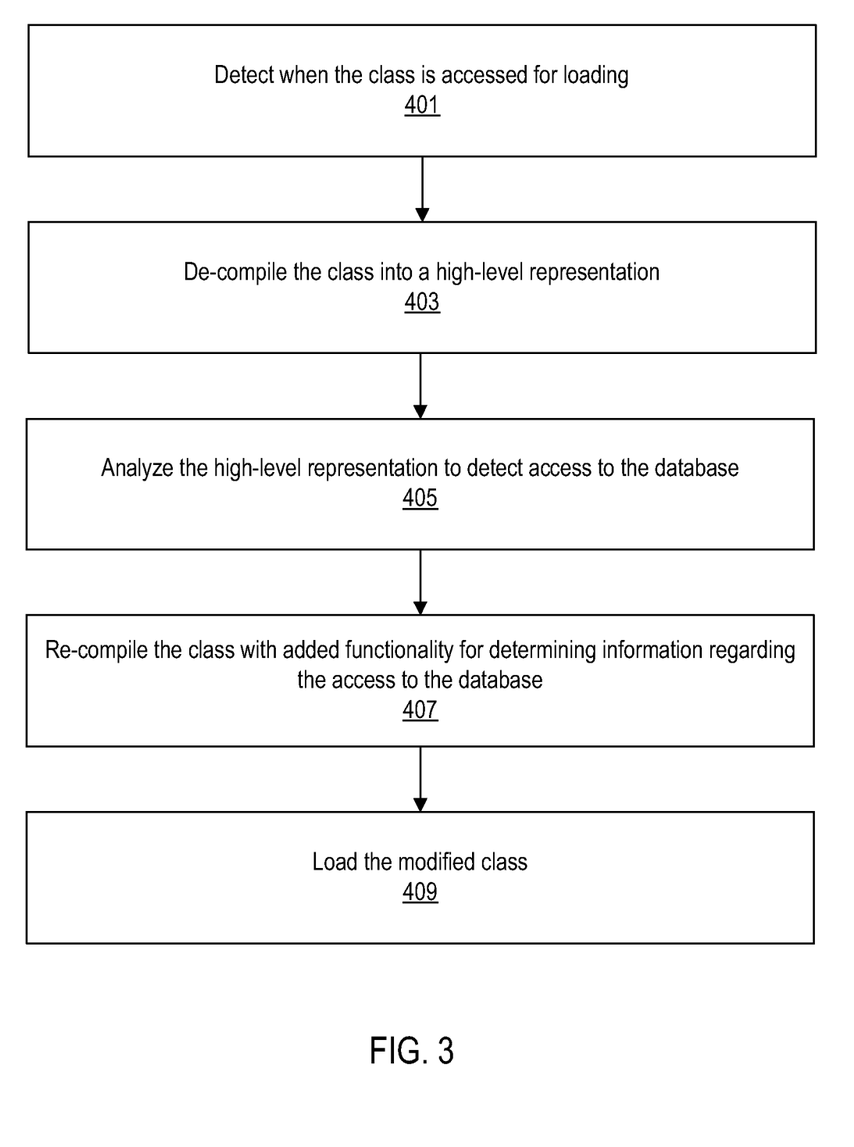
FIG. 3 is a flowchart diagram illustrating one embodiment of a method for dynamically adding the additional bytecode to an object-oriented class used by the user software application.

As described above, in some embodiments the bytecode that determines the database access information may be dynamically added during execution of the user software application. FIG. 3 is a flowchart diagram illustrating one embodiment of a method for dynamically adding the bytecode to an object-oriented class used by the user software application.

In 401, the method of FIG. 3 may detect when the class is accessed for loading. For example, in some embodiments a class loader module may access the class when the class is needed during execution of the user software application.

In response to detecting the access of the class, the method of FIG. 3 may operate to de-compile the class into a high-level representation. For example, the class may be de-compiled into source code or into tokens or structures representative of source code from which the bytecode of the class was created.

In 405, the high-level representation may be automatically analyzed in order to detect access to the database. For example, in some embodiments the high-level representation may be analyzed to detect whether the class includes one or more methods that perform standard library or interface calls to access the database.

In 407, the class may be re-compiled with added functionality for determining information regarding the access to the database. For example, source code or other information for determining the information may be added to the high-level representation, and the class may then be re-compiled so that it includes the added functionality. Thus, re-compiling the class may produce the additional bytecode that determines or obtains the information regarding the access to the database.

In 409, the modified class may be loaded. Thus, when the bytecode of the class executes, the additionally added bytecode that gathers the database access information may also execute.

It is noted that in various embodiments the monitoring and debugging tool 210 may be architected in various ways and may implement the functionality described above in various ways, e.g., depending on the particular type of bytecode used in the user software application or the type of virtual machine or run-time environment in which the user software application executes. In some embodiments the monitoring and debugging tool 210 may include multiple components or modules that perform the functionality described above. For example, in one embodiment the monitoring and debugging tool 210 may include a dynamic instrumentation component that operates in or with the virtual machine 215. The dynamic instrumentation component may dynamically add bytecode for determining database access information to various classes or methods of the user software application, similarly as described above. The monitoring and debugging tool 210 may also include a presentation/management component that performs various functions such as receiving the database access information determined during execution of the user software application, displaying the database access information in a graphical user interface, logging the database access information, etc. The presentation/management component may also be operable to display a configuration user interface that allows the user to specify what types of database access information should be automatically determined or other options affecting the determination of the database access information and may communicate with the dynamic instrumentation component to pass this information and configure it to add bytecode to the user software application accordingly.

As noted above, in some embodiments, the database access performed by the user software application may be detected by detecting calls to standard libraries or programming interfaces for performing database access. For example, the Java programming environment provides standard Java Database Connectivity (JDBC) interfaces for accessing a database. Thus, where the user software application is implemented using the Java programming language, the database access may be detected by detecting where the user software application uses classes or methods defined by the standard java.sql or javax.sql packages. In particular, database access information may be obtained by instrumenting the classes that implement the java.sql.Connection interface.

In an embodiment in which the bytecode of the user software application comprises Java bytecode, the monitoring and debugging tool 210 may utilize Java bytecode instrumentation techniques to automatically add bytecode to determine the database access information. Java bytecode instrumentation may be used, for example, to extract parameter values passed to JDBC methods. Java bytecode instrumentation may also be used to obtain timing, invocation count, and structural information gathered by the activation of the instrumentation calls themselves.

As a few illustrative examples, Java bytecode instrumentation technology may be used to obtain information such as the following regarding the java.sql.Connection Interface:

The URL used to connect to the database. The URL can be extracted from the first parameter of the overloaded static method java.sql.DriverManager.getConnection( . . . ). The first parameter is the URL in the form of "jdbc:subprotocol:subname".

The database user name, when the database connection is made through the java.sql.DriverManager.getConnection(String url, String user, String password) method.

The time the connection was opened, by tracking the time the java.sql.Connection object is created.

The time the connection was closed, by testing for object destruction or the calling of its close( ) method.

Currently open and closed connection counts, average and maximum time objects are opened, determined from the open and closed objects.

How many times a java.sql.Connection object was used to make SQL calls, determined by counting open and close operations on the object.

Whether a java.sql.Connection object is a unique object or part of a JDBC pool, determined by retrieving a stack trace during the object allocation.

The javax.sql.ConnectionPoolDataSource, DataSource, and PooledConnection Interfaces introduced in JDBC 2.0 and 3.0, offer alternate methods of creating database connections. Instrumenting for this information may fill in for cases where the original, JDBC 1.0, java.sql.Connection interface is not in use.

For example, the connect( . . . ) method in the java.sql.Driver Interface returns a java.sql.Connection object. This method may be instrumented for the same purposes as described above.

The java.sql.DriverManager Concrete Class may be implemented as described with reference to the java.sql.Connection interface.

The java.sql.SQLException Concrete Class exceptions often provide valuable information about problems with statements that are executed, such as the ORA error number. This information may be extracted through instrumentation of the four constructors for this exception, three of which provide a "reason" parameter.

The java.sql.SQLWarning Concrete Class may be tracked similarly to java.sql.SQLException.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., disk (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
executing program instructions on a computer system, wherein the program instructions execute to:

receive program code of a software application, wherein the program code includes bytecode for a virtual machine;

automatically analyze the bytecode to detect access to a database; and automatically add additional bytecode to the bytecode of the software application by adding additional information to the decompiled source code representation and re-compiling the source code representation with the additional information into bytecode, wherein automatically adding the additional bytecode to the bytecode of the software application comprises automatically adding the additional bytecode during execution of the software application, wherein the additional bytecode is configured to automatically determine a number of database connections opened by the software application and an amount of time a connection to the database stays open.

2. A non-transitory computer-accessible storage medium storing program instructions executable to:

receive program code of a software application, wherein the program code includes bytecode for a virtual machine;

automatically analyze the bytecode to detect access to a database, including decompiling the bytecode into source code representation; and automatically add additional bytecode to the bytecode of the software application by adding additional information to the decompiled source code representation and re-compiling the source code representation with the additional information into bytecode, wherein automatically adding the additional bytecode to the bytecode of the software application comprises automatically adding the additional bytecode during execution of the software application, wherein the additional bytecode is configured to automatically determine a number of database connections opened by the software application and an amount of time a connection to the database stays open.

3. The computer-accessible storage medium of claim 2, wherein analyzing the bytecode to detect the access to the database comprises analyzing the bytecode to detect a programmatic call that accesses the database;

wherein the added bytecode is configured to determine information regarding the programmatic call.

4. The computer-accessible storage medium of claim 3, wherein the added bytecode determining information regarding the programmatic call comprises the added bytecode determining a parameter value for the programmatic call, wherein the parameter value specifies information regarding access to the database.

5. The computer-accessible storage medium of claim 2, wherein the added bytecode is further configured to perform one or more of:

automatically determining information identifying the database;

automatically determining information for connecting to the database.

6. The computer-accessible storage medium of claim 2, wherein the bytecode of the software application includes bytecode implementing a first method;

wherein automatically adding the additional bytecode to the bytecode of the software application comprises automatically inserting at least a portion of the additional bytecode into the bytecode implementing the first method.

7. The computer-accessible storage medium of claim 2, wherein the bytecode of the software application includes bytecode implementing a first class;

wherein automatically adding the additional bytecode to the bytecode of the software application comprises automatically inserting at least a portion of the additional bytecode into the bytecode implementing the first class.

8. The computer-accessible storage medium of claim 2, wherein the database comprises a relational database.

9. The computer-accessible storage medium of claim 2, wherein the bytecode of the software application comprises bytecode for a Java Virtual Machine (JVM);

wherein the additional bytecode comprises additional JVM bytecode.

10. The computer-accessible storage medium of claim 2, wherein the bytecode of the software application comprises bytecode for a Common Language Runtime (CLR) virtual machine;

wherein the additional bytecode comprises additional bytecode for the CLR virtual machine.

11. The computer-accessible storage medium of claim 2, wherein the program instructions are further executable to:

display information determined by the additional bytecode about access of the database by the software application.

12. The computer-accessible storage medium of claim 2, wherein the program instructions are further executable to:

execute the additional bytecode, wherein the additional bytecode executes to perform one or more of:

automatically determining a time when a connection to the database is opened; or automatically determining a time when a connection to the database is closed.

13. The computer-accessible storage medium of claim 12, wherein executing the additional bytecode comprises one or more of:

executing at least a portion of the additional bytecode on a virtual machine;

compiling at least a portion of the additional bytecode into native code and executing the native code on one or more processors.

14. The computer-accessible storage medium of claim 2, wherein the program instructions are further executable to:

execute the additional bytecode, wherein the additional bytecode executes to automatically determine an amount of time that database access calls spend accessing the database.

15. The computer-accessible storage medium of claim 2, wherein the program instructions are further executable to:

execute the additional bytecode, wherein the additional bytecode executes to:

automatically determine a time when a connection to the database is opened; and automatically determine a time when the connection to the database is closed.

16. A system comprising:

one or more processors; and memory storing program instructions;

wherein the program instructions are executable by the one or more processors to:

receive program code of a software application, wherein the program code includes bytecode for a virtual machine;

automatically analyze the bytecode to detect access to a database, including decompiling the bytecode into source code representation; and automatically add additional bytecode to the bytecode of the software application by adding additional information to the decompiled source code representation and re-compiling the source code representation with the additional information into bytecode, wherein automatically adding the additional bytecode to the bytecode of the software application comprises automatically adding the additional bytecode during execution of the software application, wherein the additional bytecode is configured to automatically determine a number of database connections opened by the software application and an amount of time a connection to the database stays open.

* * * * *